M. C. LOUIS.
ANTISLIPPING DEVICE FOR HORSESHOES.
APPLICATION FILED JUNE 10, 1913.

1,097,453.

Patented May 19, 1914.

2 SHEETS—SHEET 1.

WITNESSES:

INVENTOR

BY

ATTORNEY

M. C. LOUIS.
ANTISLIPPING DEVICE FOR HORSESHOES.
APPLICATION FILED JUNE 10, 1913.
1,097,453.
Patented May 19, 1914.
2 SHEETS—SHEET 2.
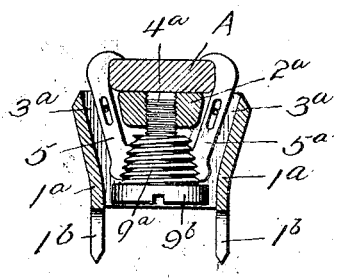
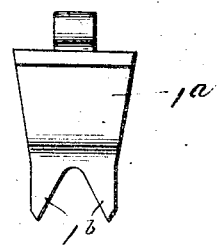
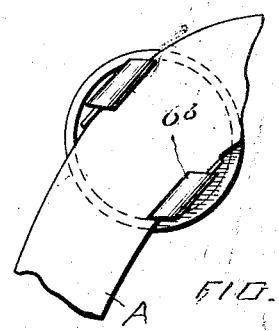
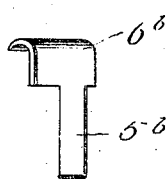
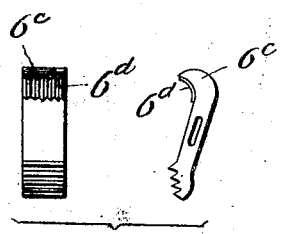
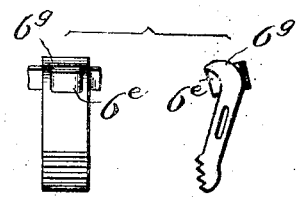
WITNESSES
INVENTOR
BY
ATTORNEYS

UNITED STATES PATENT OFFICE.

MARTIN C. LOUIS, OF DAYTON, OHIO, ASSIGNOR OF ONE-FIFTH TO CORNELIUS BROWN, ONE-FIFTH TO ARTHUR D. HOFFMAN, ONE-FIFTH TO CHARLES F. GREER, AND ONE-FIFTH TO JASPER J. GREER, ALL OF DAYTON, OHIO.

ANTISLIPPING DEVICE FOR HORSESHOES.

1,097,453.

Specification of Letters Patent.  Patented May 19, 1914.

Application filed June 10, 1913. Serial No. 772,873.

*To all whom it may concern:*

Be it known that I, MARTIN C. LOUIS, citizen of the United States, residing at Dayton, in the county of Montgomery and State of Ohio, have invented certain new and useful Improvements in Antislipping Devices for Horseshoes; and I do hereby declare the following to be a full, clear, and exact description of the invention, such as will enable others skilled in the art to which it appertains to make and use the same.

My invention relates to anti-slipping devices for horseshoes and consists in the novel features hereinafter described with reference to the accompanying drawings in which I have illustrated several forms in which the invention may be embodied and which have been selected by me for the purpose of illustration, and the said invention is fully disclosed in the following description and claims.

Figure 1:
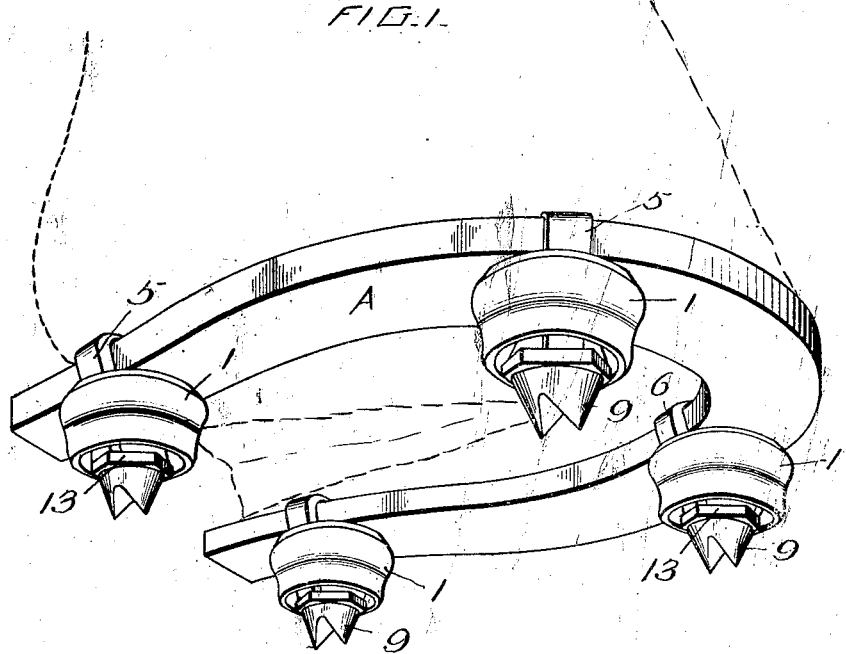
Figure 2:
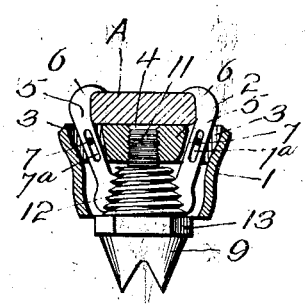
Figure 3:
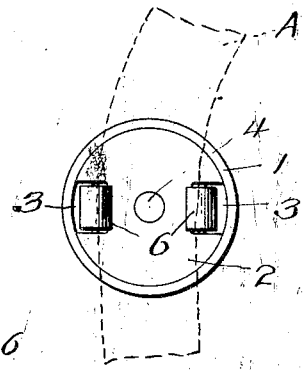
Figure 4:
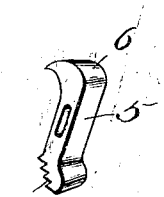

Referring to the said drawings, Figure 1 is a perspective view of a horse shoe having my improved calks attached thereto. Fig. 2 is a vertical section of one of the calks. Fig. 3 is a top plan view of a calk, showing a portion of a shoe in dotted lines for the purpose of clearness. Fig. 4 is a perspective of one of the jaws used for retaining the calk on the shoe. Fig. 5 is a vertical section of a modified form of calk. Fig. 6 is a side view of the same. Fig. 7 is a top plan view of a calk having a modified form of jaw. Fig. 8 is a side view of one of the modified forms of jaws. Fig. 9 is a face and side view of a jaw having vertical corrugations near its top. Fig. 10 is a face and side view showing a further modification of one of the jaws.

The object of my invention is to provide a calk adapted especially for use with horse shoes or the like, to form a roughing stud for use on slippery surfaces, and which may be quickly and securely attached to or readily detached from the shoe, and preferably made of steel hardened and tempered.

In carrying out my invention, I employ a body or frame having suitable apertures to accommodate retaining jaws, and a screw threaded portion adapted to engage a screw threaded aperture to hold said jaws in engagement with the shoe.

In the embodiment of my invention as illustrated in Figs. 1, 2, 3, and 4, 1 represents a main body or frame preferably circular in form, which in this instance is provided with a top or bridge 2 having vertically disposed apertures 3 on opposite sides thereof. A screw threaded, vertically disposed aperture 4 is also provided in said top 2 at its central portion.

Vertically disposed gripping jaws 5, provided with inwardly extending heads 6 are pivotally mounted in the apertures 3, and retained therein by means of pins 7 secured to the frame and passing through the elongated slots 7$^a$ of the jaws.

9 represents a calk, having a screw threaded shank 11 and a screw threaded cone-shaped portion 12, said calk being adapted to be inserted between the lower extremities of the jaws 5, when the screw threaded shank 11 will engage the screw threaded aperture 4, and as it is screwed into said aperture, the cone-shaped portion engages the inclined corrugations 8 of the jaws.

It will be seen from the drawing, that the threads on the screw threaded shank 11 are opposite to and of less pitch than the threads on the cone-shaped portion 12. This is to cause the jaws 5 to be drawn down and their lower ends to be spread apart a comparatively great distance by the cone portion 12, as the shank 11 is screwed into the aperture 4. As the shank advances into said aperture 4, it is obvious that the lower ends of said jaws will be forced outwardly and the gripping portions of the jaws will be forced inwardly and made to grip the shoe, whereby the frame and calk are retained securely in place upon the shoe. This operation may be facilitated by providing the calk with flattened portions 13 to permit the application of a suitable wrench.

In Figs. 5 and 6 I have shown a slight modification of my device in which the top 2$^a$, aperture 3$^a$, screw threaded aperture 4$^a$ and the jaws 5$^a$ are constructed as shown in Figs. 1, 2, 3 and 4. In Figs. 5 and 6, however, the frame 1$^a$ is provided with pointed portions 1$^b$, which act as the roughing stud, and the cone-shaped portion 9$^a$ is provided with a screw head 9$^b$ adapted to be engaged by a suitable tool. This construction may be secured to the shoe, by inserting the point of a screw driver in the slot, in the screw head 9ᵇ and rotating the same when the operation of tightening the gripping portions of the jaws upon the shoe will be the same as that already described with reference to Figs. 1, 2, 3 and 4.

In Figs. 7 and 8, I have shown another modification of my invention in which the gripping portions 6ᵇ of the jaws 5ᵇ are diagonally disposed to each other and grip the shoe on opposite sides thereof, but not directly opposite each other. In other words, the pivoted portions of the jaws 5ᵇ are vertically disposed in the frame on opposite sides thereof and are in parallel relation while their gripping portions 6ᵇ are not in alinement and extend longitudinally of the shoe in opposite directions. By this construction the gripping portions of the jaws will take a firmer hold and especially so where the shoe curves.

In Fig. 9 I have shown the gripping portions 6ᶜ of the jaws provided with corrugations 6ᵈ which are for the purpose of preventing the gripping portions from slipping along the sides of the shoe. In Fig. 10 I have shown a piece of leather 6ᵉ provided upon the gripping portion 6ᵍ of the shoe to act in the same manner as the corrugations in Fig. 9. The jaws 5 may be removed by taking out the pins 7. This will permit new jaws to be placed in the frame should a jaw become injured and it will be noted that the elongated slots in the jaws permit of adjustment for shoes of different thickness.

While I have selected a number of embodiments of my invention for the purpose of illustrating the same, I do not desire to be limited to the exact details of construction shown and described, as variations therein may be made without departing from the spirit of my invention.

What I claim and desire to secure by Letters Patent is:—

1. An anti-slipping device for horseshoes, comprising a main frame provided with a top, having apertures therethrough, vertically disposed jaws pivotally mounted in said apertures and provided with gripping portions and with downwardly extending portions, a cone-shaped part provided with a screw threaded shank to engage a screw threaded aperture in the top, said conical part being adapted to engage the downwardly depending portions of the jaws and spread the same and thereby force the gripping portions of said jaws into engagement with the shoe and hold the device in place, and a calk rigidly connected to said structure.

2. An anti-slipping device for horse shoes, comprising a main frame provided with a top, having apertures therethrough, vertically disposed jaws pivotally mounted in said apertures and provided with gripping portions and with downwardly extending portions, a cone-shaped part provided with a screw threaded shank to engage a screw threaded aperture in the top, said conical part being adapted to engage the downwardly depending portions of the jaws and spread the same and thereby force the gripping portions of said jaws into engagement with the shoe and hold the device in place.

3. An anti-slipping device for horse shoes, comprising a main frame provided with a top having apertures therethrough, vertically disposed jaws pivotally mounted in said apertures, provided with gripping portions and with downwardly extending portions, the inner faces of which are provided with corrugations, a cone-shaped screw threaded part provided with a screw threaded shank to engage a screw threaded aperture in the top, said conical part being adapted to engage the corrugations of the downwardly depending portions of the jaws and spread them apart, thereby forcing the gripping portions of said jaws into engagement with the shoe and securing the device in place.

4. An anti-slipping device for horse shoes, comprising a main frame, a supporting part extending across the top of said frame, provided with a screw threaded aperture, jaws provided with vertically disposed slots, said jaws being provided with gripping portions and with downwardly extending portions, pivot pins secured to the frame and passing through said slots, a cone-shaped part provided with a screw threaded shank to engage the aperture in the supporting part, and adapted to force the gripping portions of the jaws into engagement with the shoe, said cone-shaped part being provided with a calk.

5. An anti-slipping device for horseshoes, comprising a main frame, vertically disposed jaws pivotally mounted in said frame at opposite sides thereof and in parallel relation with each other, said jaws being provided with horizontally extending portions adapted to grip the sides of the shoe at opposite edges thereof, but being out of alinement with relation to each other, and means for forcing said gripping portions into engagement with said shoe and securing the device in place.

6. An anti-slipping device for horseshoes comprising a frame, a supporting part extending across the frame and provided with a screw threaded aperture, jaws having downwardly extending portions, the inner faces of which are provided with corrugations, and a screw threaded shank adapted to engage said screw threaded aperture and provided with means engaging said corrugations for drawing the jaws downwardly and forcing them into engagement with the shoe.

7. An anti-slipping device for horseshoes, comprising a frame, a supporting part extending across the frame, provided with a screw threaded aperture, jaws having vertically disposed slots, gripping portions and downwardly extending portions, the inner faces of the downwardly extending portions being provided with corrugations, a cone-shaped screw threaded part provided with a shank having screw threads which are opposite to and of less pitch than the threads on the cone-shaped portion, said screw threaded shank being adapted to engage the aperture in the supporting part, said conical part being adapted to engage the corrugations of the downwardly depending portions of the jaws and draw them down and force them apart when the screw threaded shank is forced into its aperture, thereby forcing the gripping portions of said jaws into engagement with the shoe to secure the device in place.

In testimony whereof I affix my signature, in the presence of two witnesses.

MARTIN C. LOUIS.

Witnesses:
MARGARET JOHNSON,
R. G. TAYLOR.